(12) United States Patent
Eaton et al.

(10) Patent No.: US 8,000,489 B2
(45) Date of Patent: Aug. 16, 2011

(54) SPEAKER MODULE FOR ELECTRONIC DEVICE

(75) Inventors: William Chris Eaton, Cary, NC (US);
Jason D. Mareno, Raleigh, NC (US);
John Kevin Schoolcraft, Sanford, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1303 days.

(21) Appl. No.: 11/554,104

(22) Filed: Oct. 30, 2006

(65) Prior Publication Data

US 2008/0101639 A1 May 1, 2008

(51) Int. Cl.
*H04R 25/00* (2006.01)
(52) U.S. Cl. .................. 381/333; 381/189; 381/388
(58) Field of Classification Search .................. 381/306, 381/311, 333–334, 365, 384, 388, 394, 189, 381/124; 345/168; 361/680
See application file for complete search history.

(56) References Cited

U.S. PATENT DOCUMENTS

| 5,265,274 | A | 11/1993 | Knutson et al. |
|---|---|---|---|
| 6,788,793 | B2 * | 9/2004 | Tanemura et al. ............ 381/152 |
| 2003/0223610 | A1 | 12/2003 | Tanemura et al. |
| 2004/0081329 | A1 | 4/2004 | Huang |
| 2005/0124387 | A1 | 6/2005 | Ribeiro et al. |
| 2006/0084465 | A1 | 4/2006 | Kim |

OTHER PUBLICATIONS

International Search Report, International Application No. PCT/US2007/074452, Date of Mailing: Mar. 4, 2008.
Images of i95 cellular telephone handset produced by Motorola, Inc.
Images of i95 cellular telephone handset produced by Motorola, Inc. on sale to the public prior to Oct. 30, 2006.

* cited by examiner

*Primary Examiner* — Suhan Ni
(74) *Attorney, Agent, or Firm* — Coats & Bennett, P.L.L.C.

(57) ABSTRACT

A speaker module for a consumer electronics device encloses a speaker. The speaker module is sized to fit within a housing of the consumer electronics device and below an input control of the consumer electronics device. The speaker module is oriented so that the speaker projects audible sound through one or more interstitial gaps between the input control and the housing, or one or more through-holes formed in the input control.

15 Claims, 11 Drawing Sheets

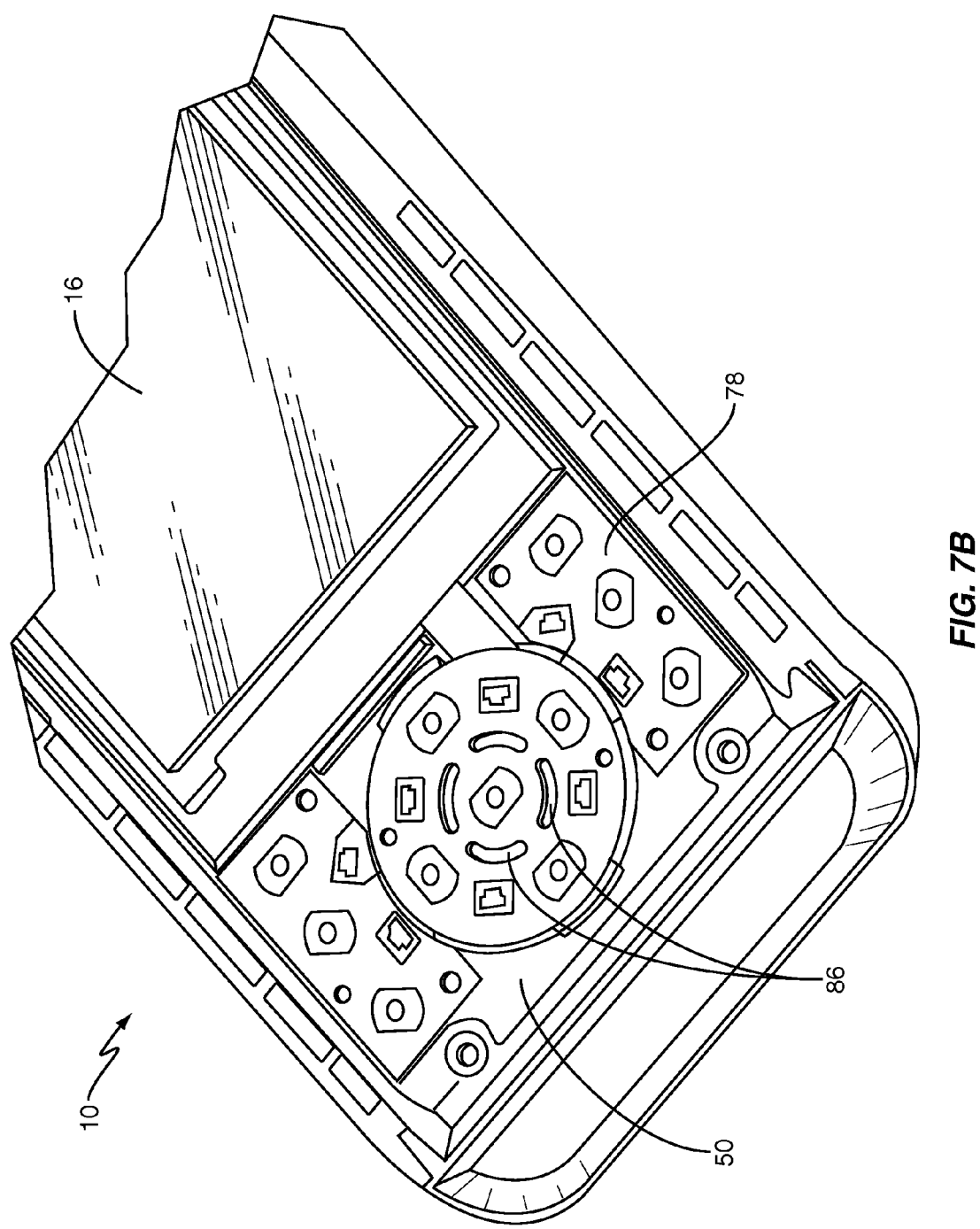

SPEAKER MODULE FOR ELECTRONIC DEVICE

BACKGROUND

The present invention relates generally to consumer electronic devices, and particularly to loudspeakers for consumer electronic devices.

Many consumer electronic devices are equipped with one or more integrated speakers that project audible sound to a user. Some cellular telephones, for example, have two speakers. The first speaker projects audible sound through a sound port that a user places next to an ear when communicating with a remote party. The second speaker, which projects sound through another sound port, permits the user to employ the device as a speakerphone or as a music playback device.

Manufacturers commonly orient their second speakers to project the audible sound through a sound port located in the rear of the housing. Such placement prevents undesirable feedback with a microphone port, which is usually located on the front of the housing, and allows the manufacturer to use the limited space within the cellular telephone. However, some cellular telephones may have relatively poor quality speakers and/or microphones. Therefore, users of these devices must sometimes flip the cellular telephone between the back and the front so that they can both hear and speak to a remote party. This is particularly burdensome when the user communicates with remote parties in a hands-free mode.

Some manufacturers address this problem by re-routing the audible sound towards the front of the device. For example, one particular "clam shell" type cellular telephone—the i95 manufactured by MOTOROLA—conventionally orients a speaker towards the rear of the device. Audible sound projected by the speaker enters a pair of specially designed waveguides. The waveguides re-direct the audible sound towards the front of the device and through corresponding sound ports disposed on either side of a keypad.

The waveguides and corresponding ports are additional specialized parts, and thus, may cost more to manufacture. In addition, they may hinder design efforts to reduce the form factor of the device. This latter aspect may be especially problematic in certain types of cellular telephones such as "sliding" type cellular telephones.

SUMMARY

The present invention is directed to a speaker module for a consumer electronic device that uses one or more interstitial spaces or gaps already present in a user-interface of the device to deliver audible sound to a user. In one embodiment, the speaker module comprises a housing having an interior chamber, a speaker sized to fit within the interior chamber, and one or more structural supports. The assembled speaker module is sized to fit entirely within an interior of the consumer electronic device, and below a user interface of the device, such as a keypad, a touchpad, a joystick, or a navigation disk, for example.

The present invention orients the speaker module within the consumer electronic device such that the speaker projects audible sound to the front of the device rather than the rear. The audible sound escapes the device through one or more sound ports located proximate one or more input controls on the user interface. In one embodiment, the sound ports comprise interstitial gaps disposed between the input controls and a housing of the consumer electronic device. In another embodiment, the sound ports comprise one or more through-holes formed in the input control. The structural supports protect the speaker within the interior chamber from damage when the user applies pressure to the input controls to operate the consumer electronic device.

BRIEF DESCRIPTION OF THE DRAWINGS

FIGS. 7A-7B are perspective views illustrating a speaker module installed within a wireless communication device in one embodiment of the present invention.

DETAILED DESCRIPTION

The present invention is directed to a speaker module for a consumer electronic device that uses one or more ambient gaps or openings present in the device to deliver audible sound to a user. The speaker module is disposed within the housing of the consumer electronic device and below one or more user input controls. The speaker module contains a speaker that is oriented towards a front of the device. In one embodiment, the speaker projects audible sound through interstitial gaps that are present between an input control and a housing of the device. This permits the user to employ the device as a speakerphone or as a playback device to render music, for example.

The specification and figures specifically embody the consumer electronic device as a cellular telephone; however, this is for illustrative purposes only. Those skilled in the art should appreciate that the present invention may be embodied in other types of consumer electronic devices including, but not limited to, a Portable Digital Assistant (PDA), a palmtop or laptop computer, a game controller, a satellite phone, or other type of consumer electronic device.

Figure 1:
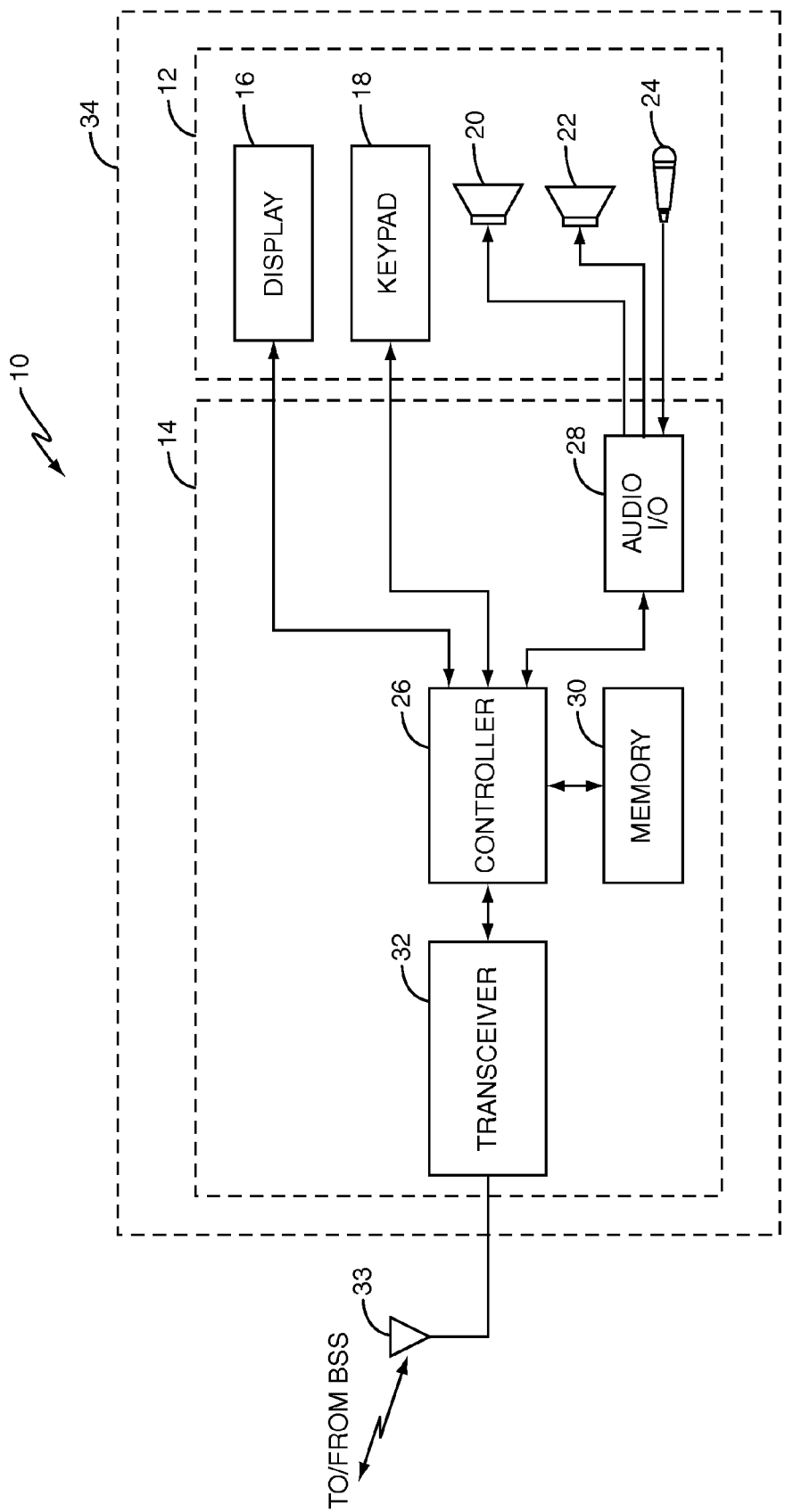
FIG. 1 is a block diagram that illustrates some of the component parts of a wireless communication device configured according to one embodiment of the present invention.
Figure 2:
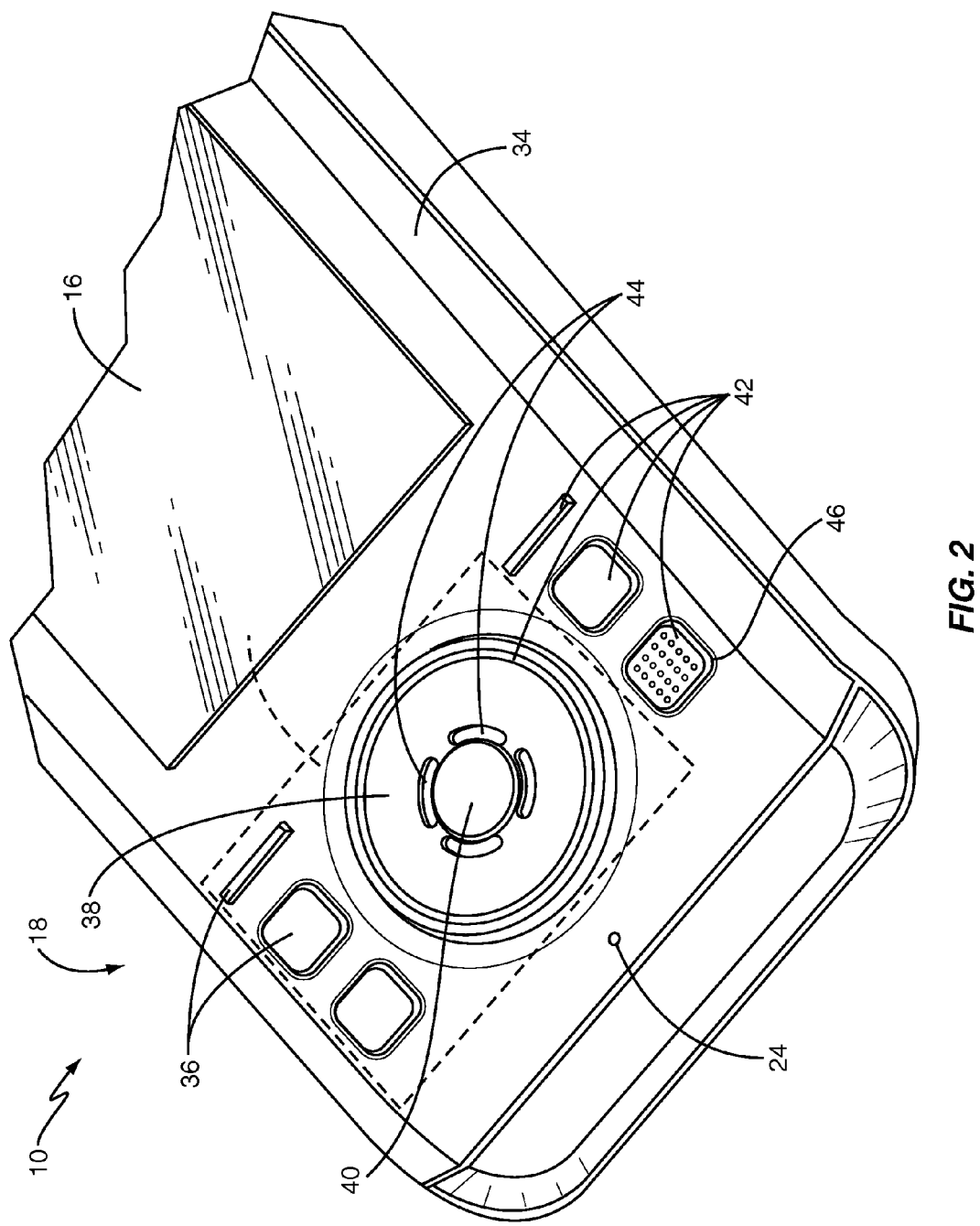
FIG. 2 is a partial perspective view of a wireless communication device configured according to one embodiment of the present invention.

FIGS. 1 and 2 illustrate a cellular telephone 10 configured according to one embodiment of present invention. Cellular telephone 10 comprises a user interface (UI) 12 and circuitry 14 disposed within a housing 34. UI 12 includes a display 16, a keypad 18, a first speaker 20, a second speaker 22, and a microphone 24. Circuitry 14 comprises a controller 26, an audio I/O circuit 28, memory 30, and a transceiver circuit 32 connected to an antenna 33.

The operation of the UI 12 and the circuitry 14 with respect to communicating with a remote party is well known in the art. Therefore, this functionality is not described in detail herein. It is sufficient for the purposes of the present invention to understand that the cellular telephone 10 is a fully functional cellular radio device capable of operating according to any known standard. Such standards include, but are not limited to, Global System for Mobile Communications (GSM), Universal Mobile Telecommunication System (UMTS), TIA/EIA-136, Code Division Multiple Access (CDMA), cdmaOne, cdma2000, and Wideband CDMA.

FIG. 2 illustrates the UI 12 in closer detail. As seen in FIG. 2, the UI 12 comprises one or more user input controls that permit the user to enter commands, play games, select audio files to render through speaker 22, and navigate and select options from various menus stored in memory 30. The types of user input controls that may be included on cellular telephone 10 include, but are not limited to, one or more buttons 36 and relative motion devices such as touchpad 38.

In this embodiment, touchpad 38 comprises a motion-sensitive pad surrounding a button 40. The touchpad 38 allows a user to navigate display 16 responsive to sensing movement of the user's finger. By way of example, the user may use touchpad 38 to move a cursor or a highlight bar around the display 16 to select a desired object such as a menu option or icon. The user may depress button 40 to select the object and/or cause controller 26 to execute functionality associated with the selected object.

The buttons 36 and the touchpad 38 are spaced from housing 34 by a small space termed herein as an interstitial gap 42. The interstitial gaps 42 may extend around the entirety of a button 36 and/or the touchpad 38, or may extend around only a part of a button 36 and/or the touchpad 38. One or more openings 44 may also be formed between the touchpad 38 and the button 40. Additionally, one or more of the buttons 36, 40 and/or the touchpad 38 may include one or more integrally formed through-holes 46. According to the present invention, the interstitial gaps 42, the openings 44, and/or the through holes 46 function as sound ports. The sound ports deliver audible sound from the interior of the cellular telephone 10 when the cellular telephone 10 is used as a speakerphone, or as an audio playback device to render music or audio associated with a video being displayed on display 16.

In this embodiment, the speaker 22 is contained within a speaker module 50 that is positioned under one or more of the buttons 36, 40, and/or the touchpad 38. The speaker 22 is oriented within the speaker module 50 such that it faces towards one or more of the interstitial gaps 42, openings 44, and/or through holes 46 located on cellular telephone 10. This deviates from conventional devices that orient their internal speakers away from the input controls, and eliminates the need to include specially formed waveguides or other sound ports with cellular telephone 10, although these may be included if desired.

Figure 3:
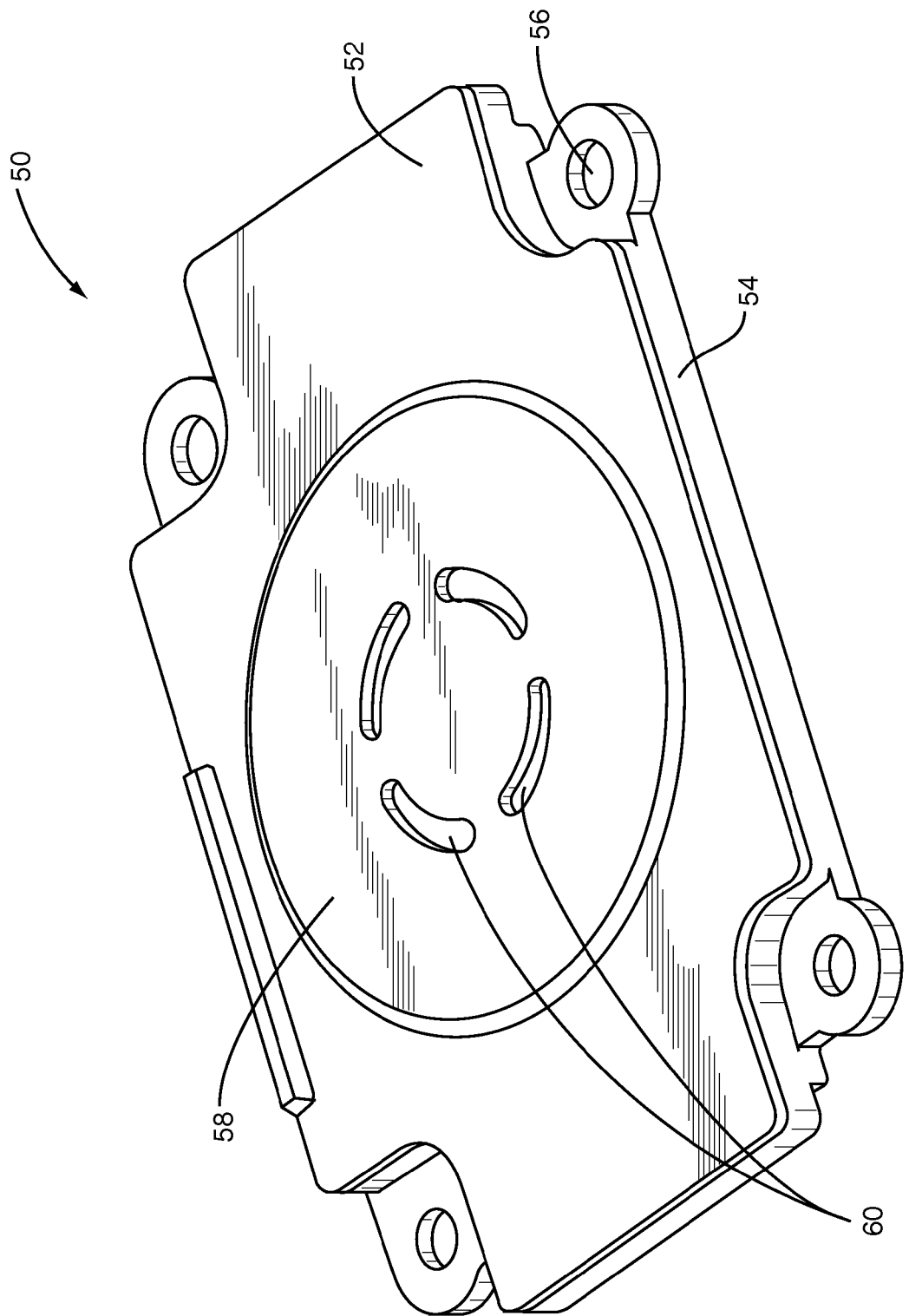
FIG. 3 is a perspective view of a top surface of a speaker module according to one embodiment of the present invention.
Figure 4:
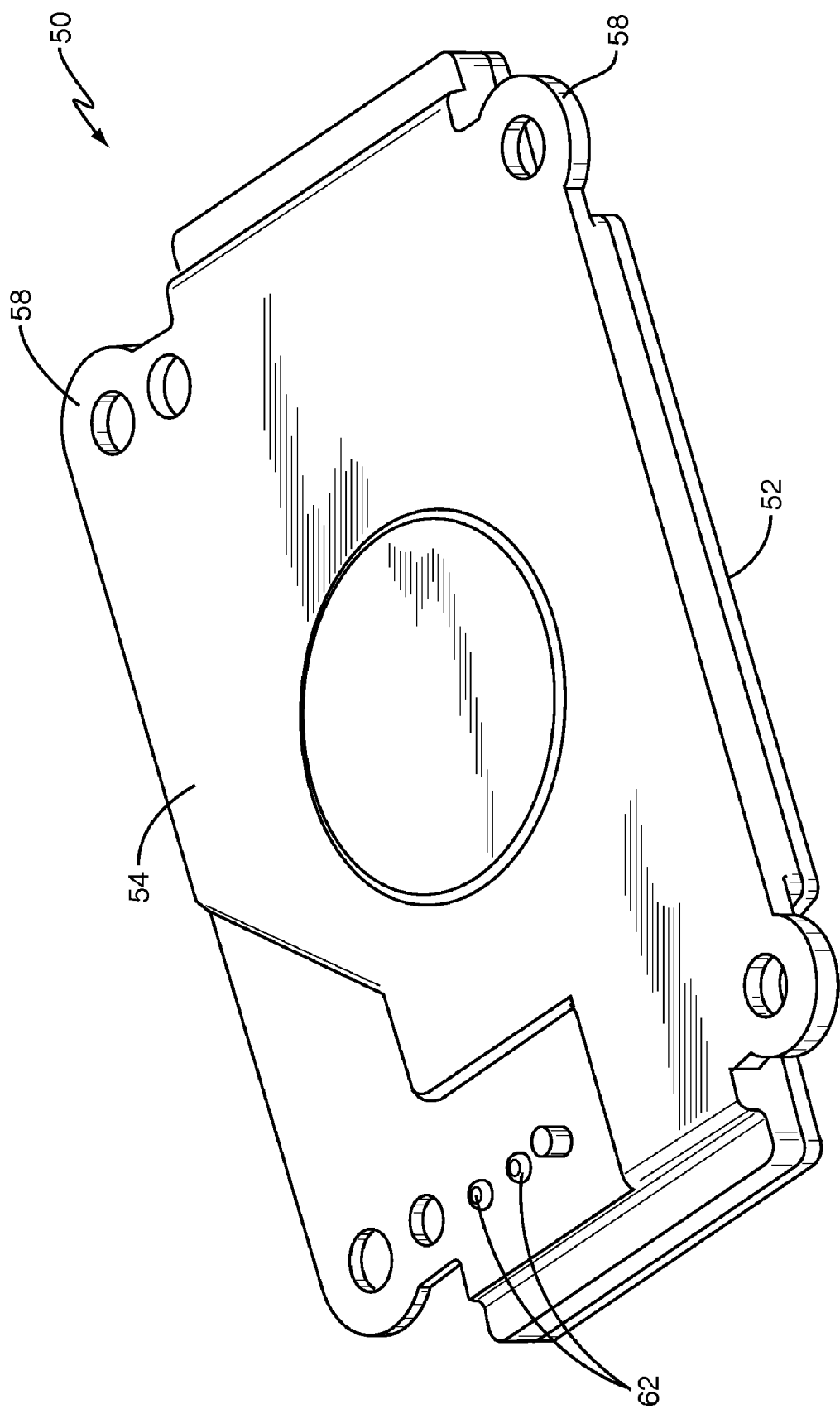
FIG. 4 is a perspective view of a bottom surface of a speaker module according to one embodiment of the present invention.
Figure 5:
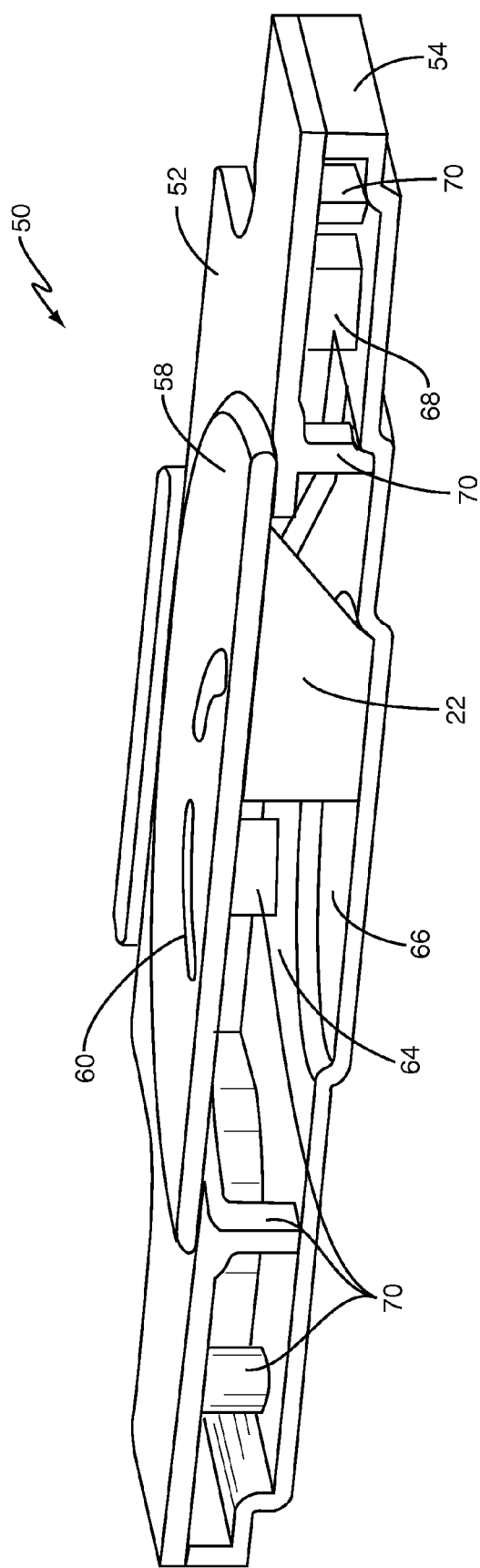
FIG. 5 is a cut-away view showing an interior of a speaker module according to one embodiment of the present invention.

FIGS. 3-5 illustrate the speaker module 50 in more detail. Speaker module 50 is sized and shaped to fit entirely within the housing 34 of the cellular telephone 10. As seen in FIGS. 3-4, speaker module 50 comprises a housing that includes a first part 52 mated to a second part 54. Each part 52, 54 may be constructed of a lightweight but rigid material such as plastic. One or more integrally-formed eyelets 56 may extend from one of the first and/or second parts 52, 54, to receive mechanical fasteners used to fixedly connect the speaker module 50 to the interior of the cellular telephone 10. A cap 58 connects to the first part 52 of the housing, and includes one or more openings 60. The openings 60 permit audible sound projected by speaker 22 to exit from the speaker module 50, and direct that projected sound to one or more of the interstitial gaps 42, the openings 44, and the through holes 46. One or more contacts 62 may electrically connect the speaker module 50 to an audio circuit (not shown) disposed within the cellular telephone 10.

In one embodiment, cap 58 comprises a tempered metallic cap that is approximately 0.6 mm thick. However, other caps having a different thickness and/or hardness are also possible. The rigidity and the hardness of the cap 58 helps to structurally support the speaker module 50. In addition, the cap 58 helps to protect the speaker 22 contained within speaker module 50 against the pressures or forces applied to buttons 36, 40 and/or the touchpad 38 by the user. In one embodiment, for example, the cap 58 is able to withstand at least a typical amount of user-applied pressure to the input controls.

FIG. 5 illustrates speaker module 50 with a portion cut-away to disclose the interior of speaker module 50. The first and second parts 52, 54 of the speaker module 50 form an interior chamber 64. Speaker 22 sits snugly within a depression 66 formed on the interior surface of the second part 54, and is sized to fit entirely within the interior chamber 64. An electrical conduit, such as wires or flex cabling, may connect the speaker 22 to the contacts 62. In one embodiment, a driver circuit 68 may be disposed within the interior chamber 64 between the speaker 22 and the contacts 62 to electrically drive the speaker 22.

As stated above, the speaker module 50 is disposed below the user input controls. Therefore, the speaker 22 within the interior chamber is also oriented towards the input controls. This orientation within the speaker module 50 allows speaker 22 to project audible sound through the openings 60 in cap 58, and through one or more of the interstitial gaps 42, openings 44, and through holes 46. Additionally, one or more columnar supports 70 may extend between the interior surfaces of the first and second housing parts 52, 54 to provide additional structural support to speaker housing 50, and protection to speaker 22. In this embodiment, columnar supports 70 are positioned annularly beneath the cap 58 as well as at selected points proximate the sides of speaker 22. The columnar supports 70 may be constructed, for example, of a hard plastic, and be able to withstand at least a typical amount of user-applied force to the input controls.

Figure 6:
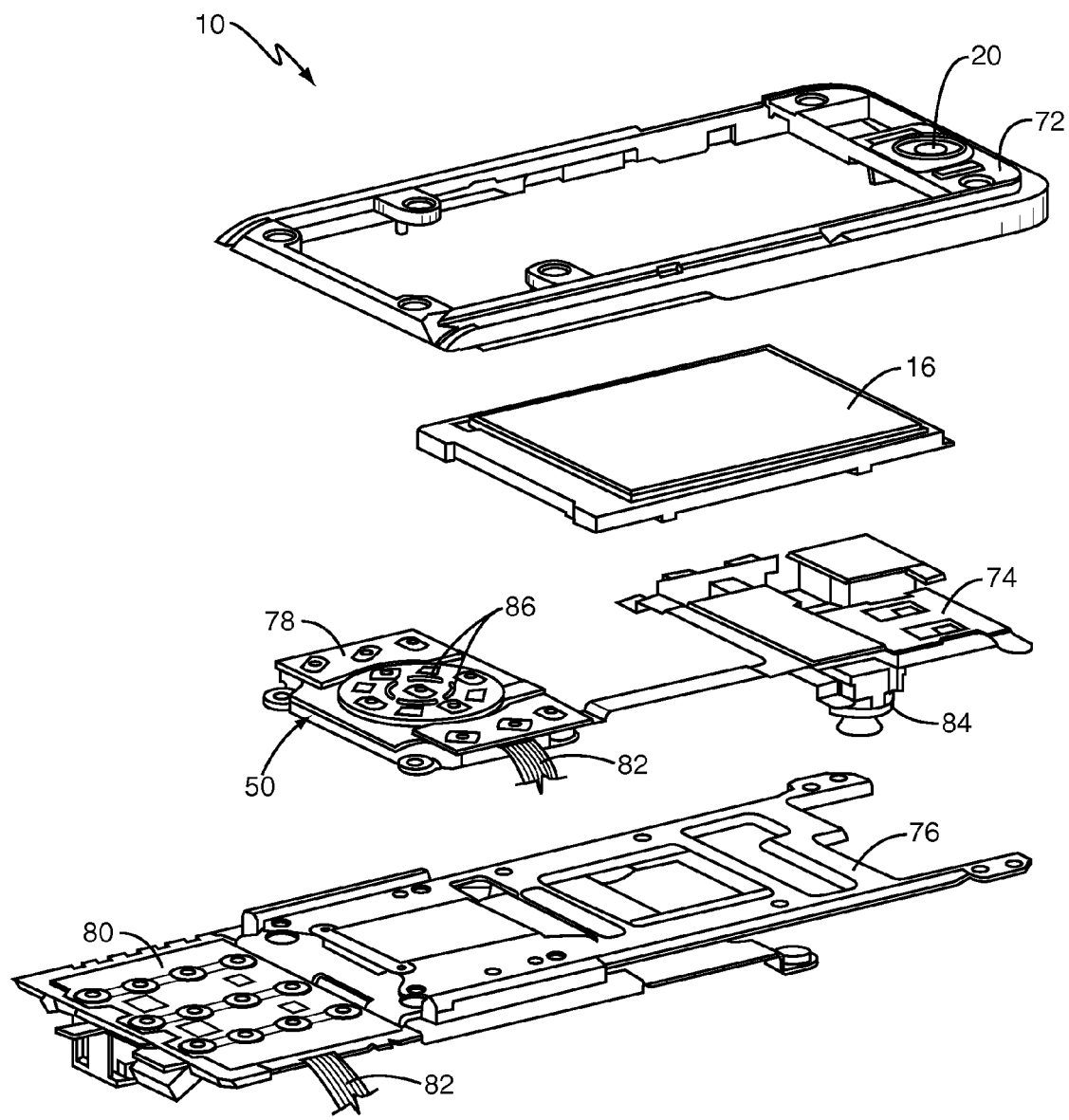
FIG. 6 is an exploded view showing one possible placement of a speaker module relative to other components of a wireless communication device in one embodiment of the present invention.

FIG. 6 is an exploded view that illustrates how speaker module 50 might be positioned within the cellular telephone 10 relative to some of the internal components of cellular telephone 10. For clarity, not all internal components have been shown in FIG. 6.

As seen in FIG. 6, the component parts include, but are not limited to, a front frame 72, display 16, a flex circuit 74, speaker module 50, and a rear frame 76. While not specifically shown in this figure, those skilled in the art will appreciate that housing 34 of the cellular telephone 10 may encase each of these components.

The front frame 72 is disposed near the front of the cellular telephone 10 proximate UI 12. The front frame 72 may provide some structural support for cellular telephone 10, and includes one or more tabs that receive mechanical fasteners. The mechanical fasteners (best seen in FIG. 7A) may extend through the tabs in the front frame 72 and the eyelets 56 on speaker module 50, and into corresponding receptacles formed in the rear of the housing 34. The front frame 72 also receives the display 16, and may include the first speaker 20 and associated circuitry employed to project audible sound when the cellular telephone is not in a hands-free mode.

The flex circuit 74 comprises components used to perform other functionality. Such components include, but are not limited to, a camera 84 to capture image and/or video. The flex circuit 74 may also include a contact circuit 78 that registers input signals responsive to the user entering commands using the input controls. For example, whenever the user depresses button 36 or button 40, a dome switch (not shown) or other well-known component may be deformed into contact with conductive portions of the contact circuit 78. The resultant signals are sent to a printed circuit board (PCB) 80 via a flex cable 82. Controller 24 may ultimately process these signals as a keypress, for example, and execute the appropriate functionality.

Figure 7A:
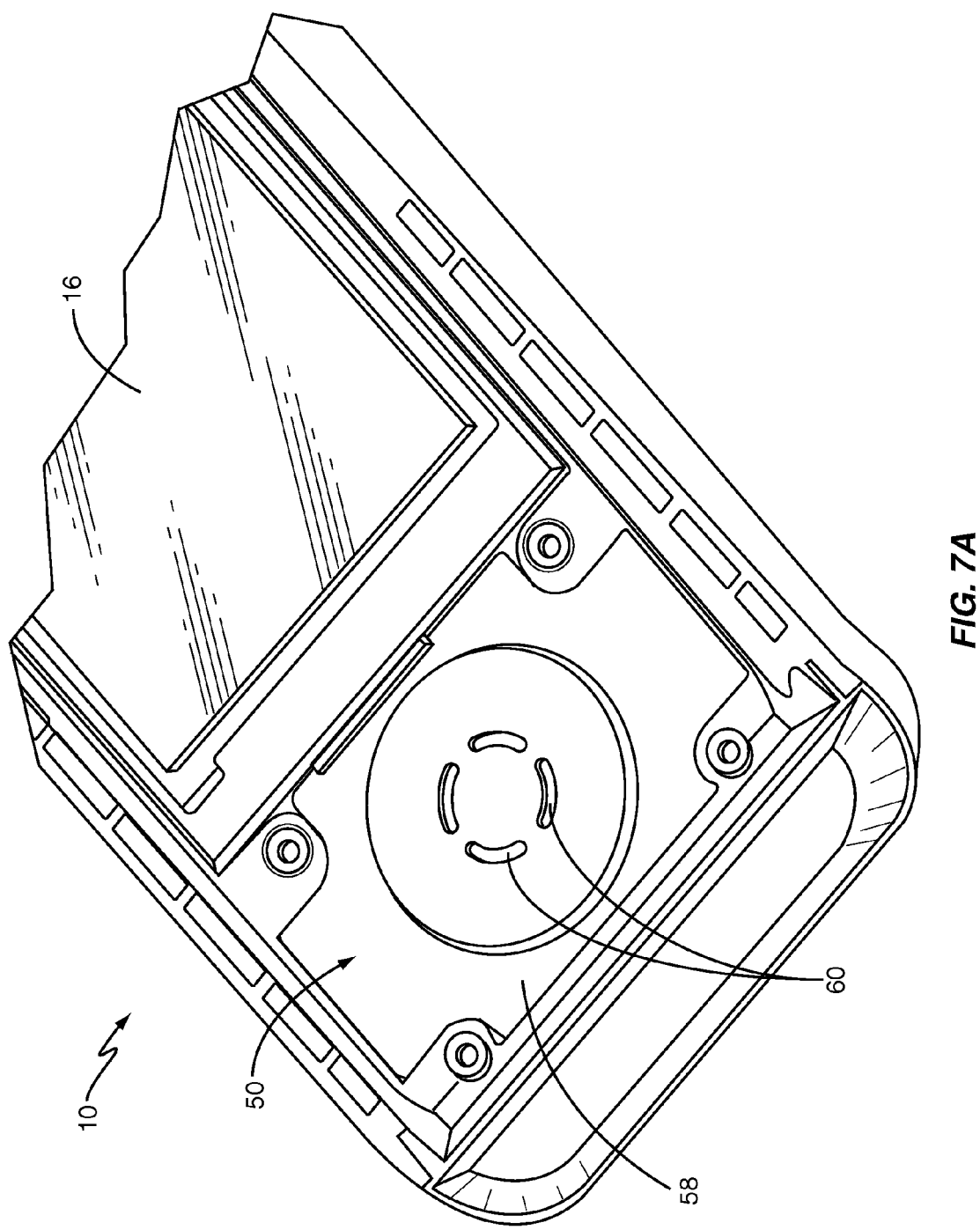

FIGS. 7A-7B illustrates the speaker module 50 as it might be contained within the housing 34 of cellular telephone 10. As seen in FIG. 7A, speaker module 50 lies below the input controls. In this embodiment, the cap 58 with openings 60 lies generally below the touchpad 38 and button 40, and faces towards the underside of the touchpad 38 and button 40. The contact circuit 78 (FIG. 7B) lays on an exterior surface of the speaker module 50 and the cap 58, and is disposed between speaker module 50 and the underside of the input controls. The contact circuit 78 may include one or more openings 86 that generally align with the openings 60 on cap 58. Speaker 22 projects audible sound through the openings 60, 86, and through the interstitial gap 42 extending around the touchpad 38. Audible sound may also be projected through the openings 44 disposed between the touchpad 38 and button 40.

Figure 8:
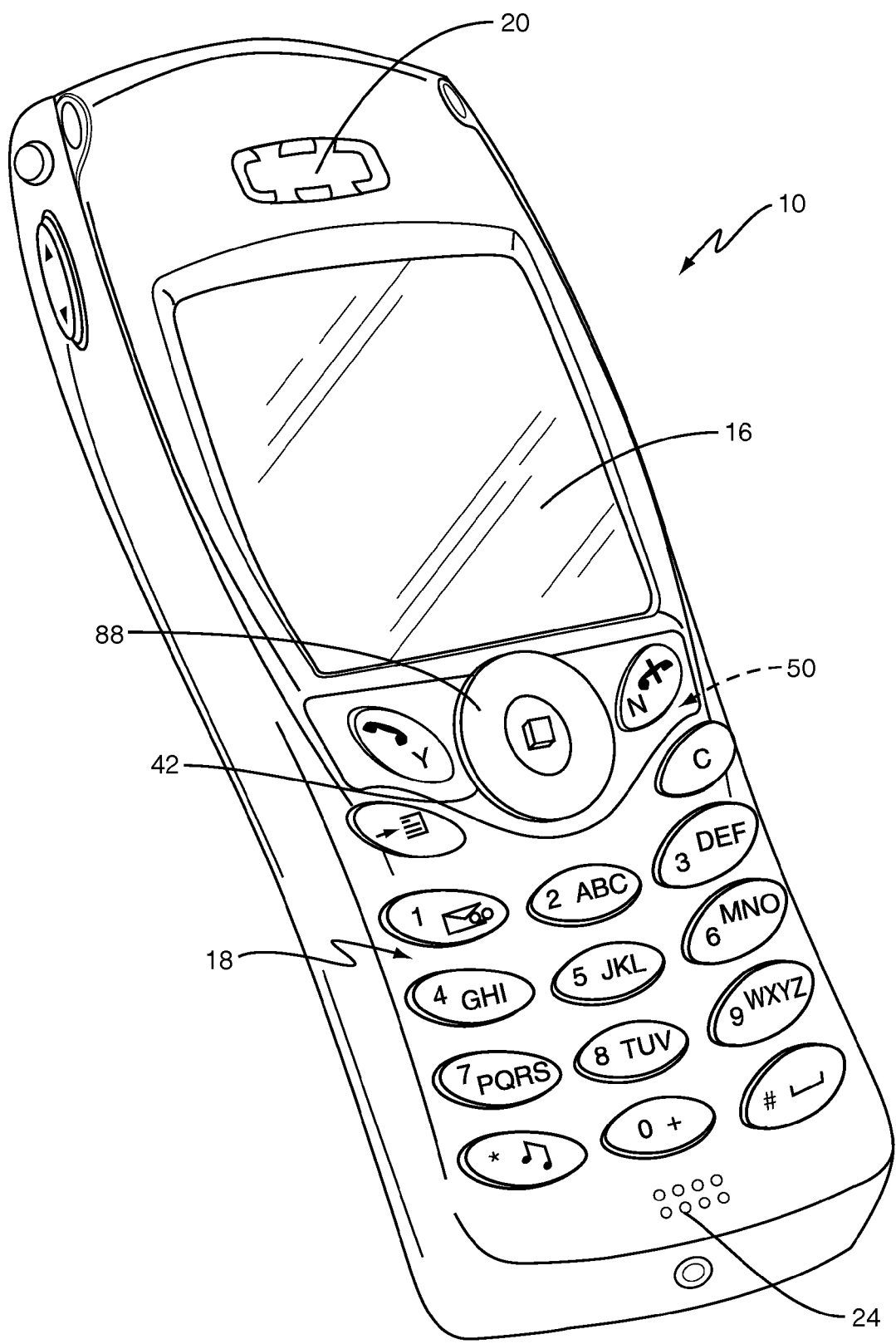
FIG. 8 is a perspective view illustrating a speaker module installed within a wireless communication device in another embodiment of the present invention.
Figure 9:
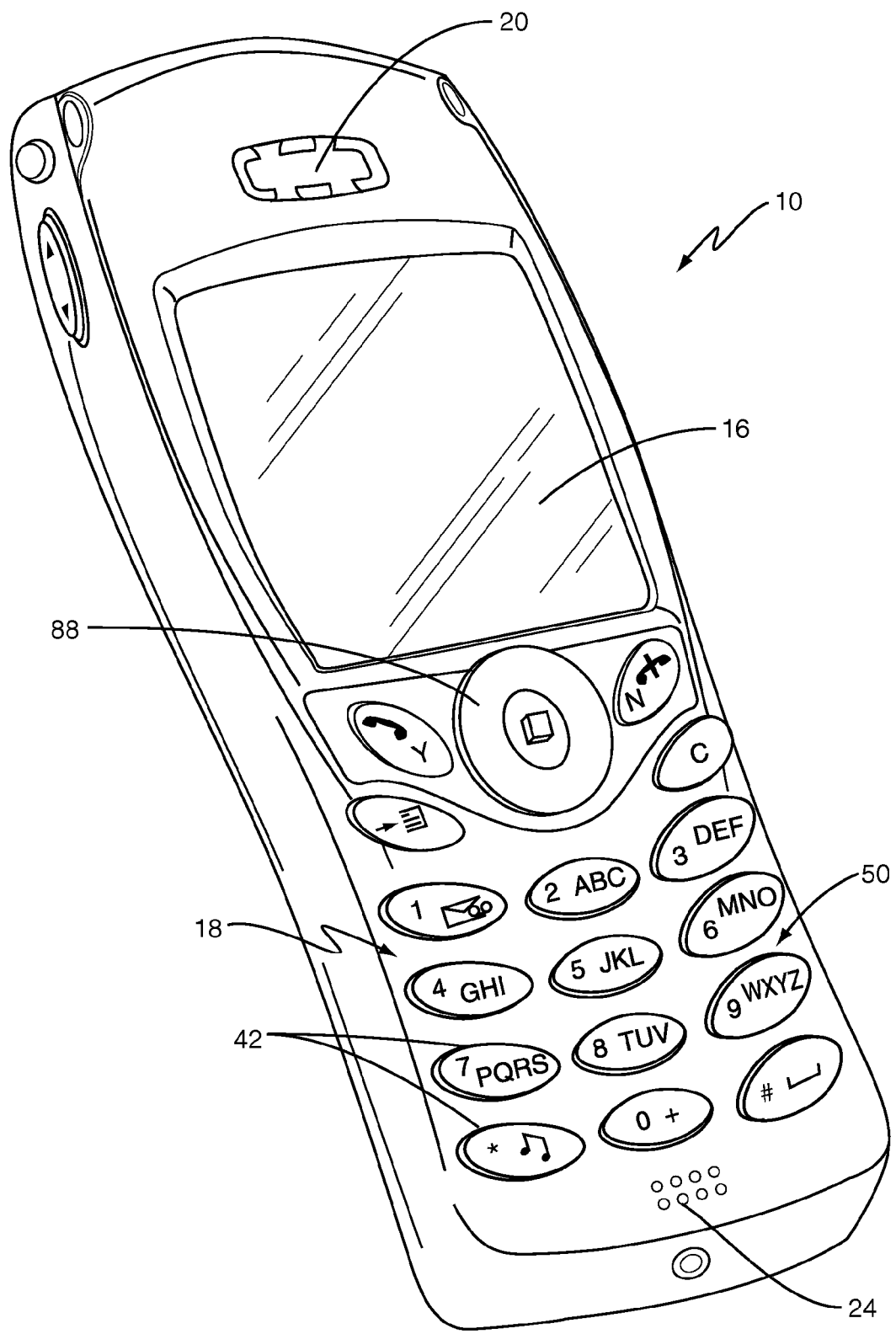
FIG. 9 is a perspective view illustrating a speaker module installed within a wireless communication device in another embodiment of the present invention.

FIGS. 8-9 illustrate other embodiments of the present invention. In FIG. 8, the speaker module is disposed in another type of cellular telephone 10 under navigation control 88. In FIG. 9, the speaker module 50 is disposed below a portion of a keypad. In either embodiment, the speaker 22 within the speaker module 50 is oriented to project audible sound through interstitial gaps 42 associated with the touchpad 38 and/or the keys on the keypad.

Figure 10:
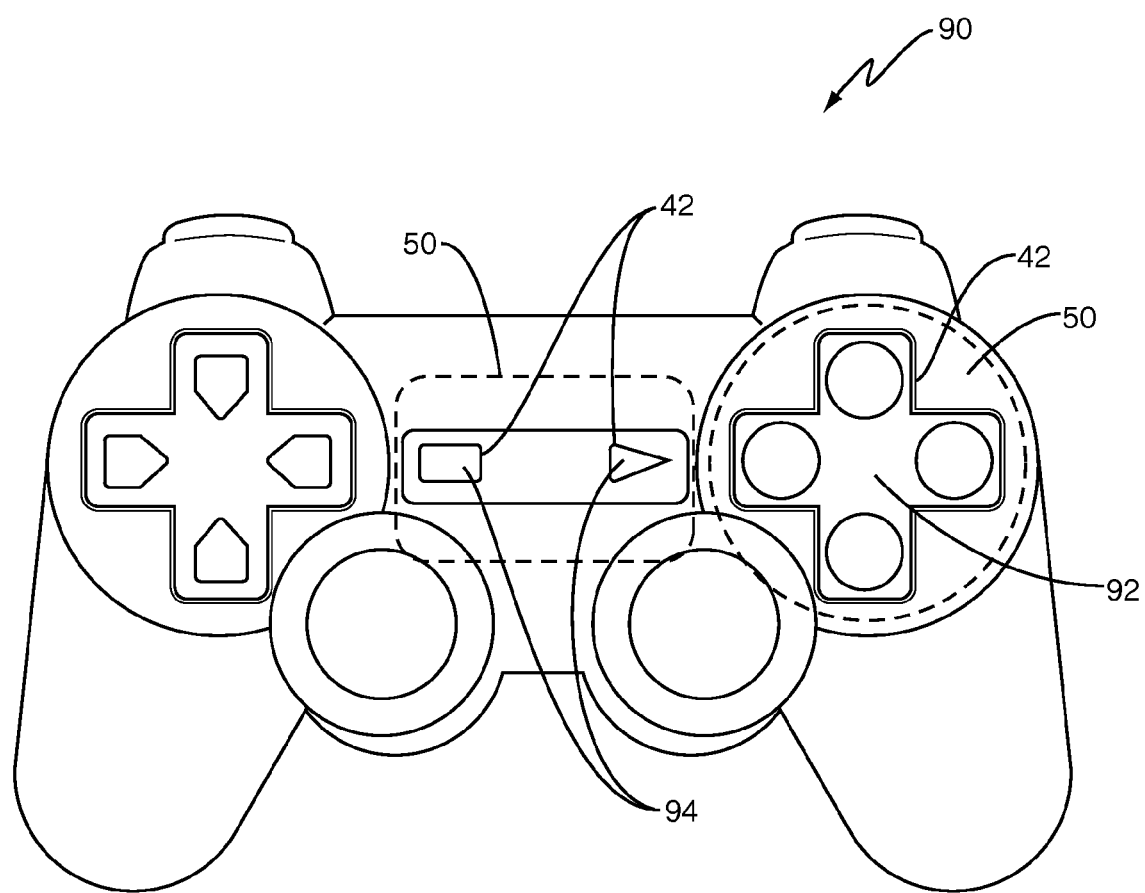
FIG. 10 is a perspective view illustrating a speaker module installed within a wireless communication device in another embodiment of the present invention.

FIG. 10 illustrates another embodiment wherein the speaker module 50 is included within the interior of a game controller 90. As seen in FIG. 10, the speaker module 50 may be placed within the interior of game controller 90 and below a movable navigation disk 92. In an alternate placement, the speaker module 50 may be placed under control buttons 94. As above, the present invention positions and orients the speaker 22 within the speaker module 50 to project audible sound through the interstitial gaps 42 extending around the navigation disk 92 and/or the control buttons 94.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A consumer electronic device comprising:
   a housing;
   an input control a sound port comprising an interstitial gap between the input control and the housing;
   a speaker module forming an interior chamber and sized to fit within the housing and below the input control;
   a speaker disposed within the interior chamber and arranged to project audible sound through the sound port; and
   one or more structural supports disposed within the interior chamber and configured to protect the speaker against damage from a user-applied pressure to the input control.

2. The device of claim 1 wherein the interstitial gap comprises a space that extends substantially around the input control.

3. The device of claim 1 wherein the input control comprises a first input control surrounded by a second input control, and wherein the interstitial gap includes one or more openings formed between the first and second input controls.

4. The device of claim 1 wherein the speaker module comprises a driver circuit disposed within the interior chamber to drive the speaker.

5. The device of claim 1 wherein the speaker module comprises one or more contacts to electrically couple the speaker to an electrical circuit within the housing.

6. A method of projecting audible sound from a consumer electronic device, the method comprising:
   positioning a speaker module having an interior chamber within a housing of a consumer electronic device and below an input control;
   enclosing a speaker within the interior chamber;
   orienting the speaker within the interior chamber to project audible sound through an interstitial gap disposed between the input control and the housing; and
   disposing one or more structural supports within the interior chamber to protect the speaker from user pressure applied to the input control.

7. The method of claim 6 wherein orienting the speaker to project audible sound through an interstitial gap comprises positioning the speaker under one or more openings formed between the input control and the housing.

8. The method of claim 6 wherein orienting the speaker to project audible sound through an interstitial gap comprises positioning the speaker under a space that extends around the input control.

9. A consumer electronic device comprising:
   a housing;
   an input control having a sound port;
   a speaker module forming an interior chamber and sized to fit within the housing and below the input control;
   a speaker disposed within the interior chamber and arranged to project audible sound through the sound port in the input control; and
   one or more structural supports disposed within the interior chamber and configured to protect the speaker against damage from a user-applied pressure to the input control.

10. The device of claim 9 wherein the input control comprises a first input control surrounded by a second input control, and wherein the sound port comprises one or more openings formed between the first and second input controls.

11. The device of claim 9 wherein the sound port comprises one or more through-holes formed in the input control.

12. The device of claim 9 wherein the speaker module comprises a driver circuit disposed within the interior chamber to drive the speaker.

13. The device of claim 9 wherein the speaker module comprises one or more contacts to electrically couple the speaker to an electrical circuit within the housing.

14. A method of projecting audible sound from a consumer electronic device, the method comprising:
   positioning a speaker module having an interior chamber within a housing of a consumer electronic device and below an input control;
   enclosing a speaker within the interior chamber;
   orienting the speaker within the interior chamber to project audible sound through a sound port formed in the input control; and disposing one or more structural supports within the interior chamber to protect the speaker from user pressure applied to the input control.

15. The method of claim 14 wherein orienting the speaker comprises positioning the speaker below the input control such that the speaker projects the audible sound through one or more through-holes formed in the input control.

* * * * *

UNITED STATES PATENT AND TRADEMARK OFFICE
CERTIFICATE OF CORRECTION

| | | |
|---|---|---|
| PATENT NO. | : 8,000,489 B2 | Page 1 of 1 |
| APPLICATION NO. | : 11/554104 | |
| DATED | : August 16, 2011 | |
| INVENTOR(S) | : Eaton et al. | |

It is certified that error appears in the above-identified patent and that said Letters Patent is hereby corrected as shown below:

Col. 5, line 57 should read:

an input control;
a sound port comprising an interstitial gap between the input control and the housing;

Signed and Sealed this
Fourth Day of October, 2011

David J. Kappos
*Director of the United States Patent and Trademark Office*